United States Patent [19]

King et al.

[11] Patent Number: 5,198,485
[45] Date of Patent: Mar. 30, 1993

[54] AQUEOUS COATING COMPOSITION COMPRISING CHLORINATED POLYOLEFIN

[75] Inventors: Greg A. King, Mt. Carmel; Stephen L. Poteat, Gray; Paul J. Greene; Jonathan E. Lawniczak, both of Kingsport; James A. Stykes, Jonesborough, all of Tenn.

[73] Assignee: Eastman Kodak Company, Rochester, N.Y.

[21] Appl. No.: 743,666

[22] Filed: Aug. 12, 1991

[51] Int. Cl.$^5$ ............................................. C08L 27/04
[52] U.S. Cl. .................................... 524/243; 524/420; 524/421; 524/576
[58] Field of Search ............... 524/243, 421, 420, 576, 524/567

[56] References Cited

U.S. PATENT DOCUMENTS

| | | | |
|---|---|---|---|
| 3,579,485 | 5/1971 | Folzenlogen et al. | 525/285 |
| 4,070,421 | 1/1978 | Etter | 525/192 |
| 4,954,573 | 9/1990 | Fry et al. | 525/380 |
| 4,962,149 | 10/1990 | Fry et al. | 524/555 |
| 4,966,947 | 10/1990 | Fry et al. | 525/380 |

Primary Examiner—Joseph L. Schofer
Assistant Examiner—Jeffrey T. Smith
Attorney, Agent, or Firm—Charles R. Martin; William P. Heath, Jr.

[57] ABSTRACT

Disclosed is a composition comprising
(A) a chlorinated polyolefin,
(B) a cationic surfactant,
(C) glacial acetic acid,
(D) a salt of an oxyacid of sulfur, and
(E) water.

9 Claims, No Drawings

AQUEOUS COATING COMPOSITION COMPRISING CHLORINATED POLYOLEFIN

This invention relates to aqueous compositions useful as primers useful for enhancing the adhesion of coatings to polyolefin substrates.

The application of paints and other coatings to substrates of polyolefin, such as polypropylene, thermoplastic olefin and polyethylene, is typically difficult because polyolefins are substantially chemically inert.

This problem has previously been overcome by the use of two different approaches which employ adhesion promoting compositions. One approach is to use an adhesion promoting composition as a separate primer coating between the polyolefin substrate and the paint. The primer coating adheres adequately to both the polyolefin and the paint and thereby creates a unitary three component structure with the paint as the outer portion of the structure. Another approach to coating polyolefins has been to use an adhesion promoting composition as an additive along with the paint. This technique is sometimes known in the art as use of a "stir in" adhesion promoter.

Numerous polymeric materials have been investigated as possible components for such adhesion promoters. Chlorinated polyolefins have been found to be very satisfactory as the polymeric component for primer compositions due to their cost and performance. For example, U.S. Pat. Nos. 3,579,485, 4,070,421, 4,966,947, 4,962,149 and U.S. Pat. No. 4,954,573 disclose chlorinated polyolefins which are entirely satisfactory for the polymeric component of adhesion promoting compositions useful for coating polyolefin substrates.

Even though chlorinated polyolefins have been used to prepare adhesion promoting compositions which are entirely satisfactory, the chlorinated polyolefins had to be formulated with an organic solvent, such as xylene or toluene. Use of an organic solvent is undesirable because unless elaborate solvent recovery methods are employed, application of the primer coating composition results in release of the organic solvent into the atmosphere which can result in both pollution problems and health problems for workers applying the primer coating composition.

We have now discovered an entirely satisfactory water based chlorinated polyolefin composition which does not contain significant quantities of an organic solvent. Thus, the elimination of the organic solvent results in a composition which avoids the problems associated with compositions containing substantial quantities of an organic solvent.

Broadly, the composition of this invention can be thought of as a five component composition comprising
A) a chlorinated polyolefin having a particular range of molecular weight, softening point and amount of chlorine,
(B) a cationic surfactant,
(C) glacial acetic acid,
(D) a salt of an oxyacid of sulfur, and
(E) water.

The chlorinated polyolefins useful in this invention are can broadly described as a chlorinated polyolefin having a molecular weight in the range of 9,000 to 45,000, a softening point in the range of 75° to 105° C. and an amount of chlorine in the range of 15 to 35 weight percent, based on the weight of the polyolefin. One embodiment of the chlorinated polyolefin useful in this invention is disclosed in U.S. Pat. No. 3,579,485. A chlorinated polyolefin useful in another embodiment of this invention is the chlorinated polyolefin disclosed in U.S. Pat. No. 3,579,485 reacted with a hydroxyl group containing primary amine to form a chlorinated, imidized polyolefin. These polyolefins are known in the art and are described in U.S. Pat. No. 4,954,573. Thus, since it is within the scope of the invention to use either the chlorinated, non imidized polyolefin described in U.S. Pat. No. 3,579,485 or the chlorinated, imidized polyolefin described in U.S. Pat. No. 4,954,573 the term "chlorinated polyolefin" is meant to include both of these polymers. In a preferred embodiment, the chlorinated polyolefin has a molecular weight in the range of 9,000 to 16,000, a softening point in the range of 80° to 95° C. and an amount of chlorine in the range of 18 to 22 percent, based on the weight of the polyolefin. In this invention the molecular weight of the chlorinated polyolefin is average number molecular weight.

The total amount of polyolefin in the composition is not significant as long as the relative amounts of components (B), (C) and (D) are within the ranges for these materials.

The surfactants useful in this invention are cationic surfactants. By the term "cationic surfactant" we mean a surfactant which ionizes in water to produce a large positively charged ion and a small negatively charged ion.

The cationic surfactants useful in this invention have a molecular weight in the range of 100 to 1000 and can be broadly be described as alkoxylated amines. Preferably the cationic surfactant is a polyoxyethylene tallow amine or a polyoxyethylene stearyl amine. Examples of cationic surfactants include Varionic T202 sold by Sherex Chemical Co. Inc., Ethox TAM 2 and Ethox SAM-2 sold by Ethox Chemicals, Inc. and Ethomeen T-12 sold by Akzo Chemie America.

The amount of surfactant is broadly in the range of 20 to 40 weight percent, preferably in the range of 25 to 35 weight percent and more preferably in the range of 25 to 30 weight percent, based on the weight of the chlorinated polyolefin.

The compositions of this invention contain glacial acetic acid. This compound is well known in the art and is substantially pure acetic acid.

The amount of glacial acetic acid is in the range of 1.2 to 10 weight percent, preferably in the range of 2 to 8 weight percent and more preferably is in the range of 2.5 to 5 weight percent, based on the weight of the chlorinated polyolefin.

The compositions of this invention further contain a salt of an oxyacid of sulfur. Examples of such salts are sodium metabisulfite, sodium bisulfite, sodium thiosulfite, sodium formaldehyde sulfoxylate. Corresponding salts of potassium can also be used. Preferably the salt is sodium metabisulfite. These salts are well known in the art of emulsion polymerization as agents which produce a clearer composition. While not being bound to any particular theory to explain the clearer compositions resulting from use of such salts, one theory of particular merit is that the salt dissociates and the sulfur containing part of the fragment associates with sites on the chlorinated polyolefin left open by the surfactant.

The amount of salt is in the range of 0.2 to 2 weight percent, preferably in the range of 0.2 to 1.2 weight percent based on the weight of the chlorinated polyolefin.

The compositions of this invention further contain water. The amount of water can vary widely depending on numerous factors, such as the needs of the manufacturer, transportation efficiencies and the needs of the particular customer. An important property of the compositions of this invention is that these compositions can be manufactured using less water than would typically be required to apply the compositions as a coating and water can be subsequently added by the customer at a later time to prepare a coating composition. This can be done by simply pouring additional water into the composition prepared by the manufacturer without having to consider in detail any particular temperature, pressure or time used to prepare the diluted composition. Thus the manufacturer can prepare a "concentrated" product which is low in water and ship the concentrated product to the customer without the necessity of incurring the additional cost of also shipping additional water to the customer. A "concentrated" product is also often desired if the adhesion promoter composition is to be used as an additive to the paint in order to prevent excessive dilution of the paint.

Even though the amount of water can vary widely and there is no upper limit on the amount of water there is a lower limit on the amount of water because there must at least be sufficient water in the composition to result in the formation of an admixture of the four components. Although the precise amount of water necessary to form the required admixture can vary, generally there must be at least 40 weight % water in the composition, based on the weight of the total composition, in order to form an admixture with pourable viscosity characteristics.

The compositions of this invention can contain other materials in major amounts. For example, the compositions of this invention can contain materials typically used in the paint industry to prepare paint formulations, such as thickeners, wetting agents and flow aids, pigments, resins and solvents.

The compositions of this invention can contain organic solvents but preferably the compositions are substantially free of organic solvents. Thus, the compositions of this invention preferably contain less that 10%, more preferably less than 5% and most preferably less than 1% organic solvent. The preferably small quantity of organic solvent can be present as an impurity or ban be present as in intended component of the composition. The compositions of this invention can be used as an adhesion promoting composition according to two different approaches. Selection of the preferred approach depends on numerous factors, such as the specific characteristics of the paint, the particular substrate to be painted, the nature and extent of the other materials to be used in the paint formulation and other factors. In accordance with one approach, the coating compositions of this invention can be used as a separate primer coat by preferably diluting the manufactured composition with water, adding any desired additives and then applying the diluted composition to a polyolefin substrate to form a coating using conventional means, such as spraying, brushing or dipping. After the composition has been applied as a coating and the coating has dried a paint is applied over the primer coating. The primer coating adheres to both the polyolefin and the paint and thereby creates a unitary three component structure with the paint as the outer portion of the structure. In accordance with the other approach, the compositions of this invention can be used as a so called "stir in" paint additive. In this approach the composition is added admixed with the paint and the resulting admixture is applied to the polyolefin substrate to form a single coating which adheres to the polyolefin substrate.

The compositions of this invention can be prepared according to techniques well known in the art for preparing polyolefin wax emulsions. For example, the compositions can be prepared by introducing the four components into an agitated pressure vessel and agitating the components at a suitable temperature and pressure for a suitable time. Although the particular conditions must be selected based on the particular equipment available, the particular components of the composition and other factors, typically the temperature will be in the range of 100° C. to 150° C., the pressure in the range of 14 psi to 70 psi, and the time will be in the range of 10 minutes to 45 minutes. Other temperatures, pressures and times can be used and are within the understanding of those skilled in the art. In a preferred embodiment the compositions can be prepared using a temperature of 120° C., a pressure of 30 psi and a time of 20 minutes. After agitation the composition is to be cooled to ambient temperature. During this cooling period continued agitation often results in compositions exhibiting enhanced properties.

The compositions of this invention are admixtures which have a particle size suitably small to make the admixtures useful in coating embodiments. Therefore, the compositions of this invention include not only what some authorities call "emulsions" and "dispersions" but include as well all other physical forms in which the various components can be become admixed. For example, some authorities characterize water containing admixtures wherein the particle size in the range of 0.1 to 10 microns as an "emulsions". Other authorities regard water containing admixtures wherein the particle size is greater than 10 microns as a "dispersion". While both of these types of admixtures are within the scope of this invention, the invention is not limited to these or any other kind of particular admixture and includes all possible types of admixtures regardless of physical form as long as the particle size is small enough for the admixtures to have utility in coating applications.

While the compositions of this invention are particularly useful as adhesion promoters to enhance the adhesion of paints to polyolefin substrates it is within the scope of the invention for the compositions to be used by themselves as a paint to form a final protective coating which not only protects the substrate but also is decorative as a result of the addition of pigments.

In the following examples compositions of the invention were prepared from a chlorinated polyolefin, a cationic surfactant, glacial acetic acid, sodium metabisulfite and water. The compositions were prepared by introducing the five components into a sealed vessel equipped with a means for agitation. Agitation was started and the contents of the vessel heated to 125° C. and the resulting pressure was 30 psi. This temperature and pressure was maintained and the vessel was agitated for 15 minutes resulting in preparation of the composition. The composition was then diluted with sufficient additional water to result in a primer coating composition composed of 8 percent chlorinated polyolefin, based on the weight of total composition. This composition was applied to polypropylene. The composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F. An automotive topcoat system was spray applied and baked at 250° C. for 30 minutes. Paint adhesion tests were conducted in accordance with ASTM D3359 83, Method A. Storage stability tests were conducted by visual inspection in glass jars. Freeze/thaw stability tests were conducted in accordance with ASTM D2243 with visual inspection.

EXAMPLE 1

This example illustrates preparation of a composition of the invention using a particular chlorinated polyolefin and one type of cationic surfactant and one particular salt of an oxyacid of sulfur.

40 grams of a chlorinated, imidized polyolefin which is sold by Eastman Chemical Company under the name CP 164-1 and has a molecular weight in the range of 9,000 to 16,000, a softening point in the range of 80 to 95° C. and an amount of chlorine in the range of 18 to 22 percent, based on the weight of the polyolefin, 10 grams of a polyoxyethylene fatty amine sold by Ethox Chemicals, Inc. under the name Ethox TAM-2, 2 grams of glacial acetic acid, 124 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 4 weeks: No change
The results of freeze/thaw stability tests were slight settling after 5 cycles. The results of paint adhesion tests were as follows:
Paint adhesion on polypropylene: 95% Adhesion
Paint adhesion on TPO: 100% Adhesion.

EXAMPLE 2

This example illustrates preparation of a composition of the invention using different amounts of the same components used in Example 1.

40 grams of CP 164-1, 10 grams of Ethox TAM-2, 1 gram of glacial acetic acid, 125 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition This composition was applied to polypropylene and TPO. The results of storage stability tests were as follows:
Stability at 25° F. for 6 weeks: No change
Stability at 60° F. for 4 weeks: No change
The results of freeze/thaw stability tests were slight settling after 5 cycles. The results of paint adhesion tests were as follows:
Paint adhesion on polypropylene: 100% Adhesion
Paint adhesion on TPO: 100% Adhesion.

EXAMPLE 3

This example illustrates preparation of a composition of the invention using a different surfactant than in Example 1.

40 grams of CP 164-1, 10 grams of Ethox SAM-2 which is a polyoxyethylene fatty amine sold by Ethox Chemical, Inc., 2 grams of glacial acetic acid, 124 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 2 weeks: No change
The results of freeze/thaw stability tests were slight settling after 5 cycles. The results of paint adhesion tests were as follows:
Paint adhesion on polypropylene: 70% Adhesion
Paint adhesion on TPO: 100% Adhesion.

EXAMPLE 4

This example illustrates preparation of a composition of the invention using a different chlorinated polyolefin than in Example 3.

40 grams of a chlorinated, non imidized polyolefin which is sold by Eastman Chemical Company under the name CP 343-1 and has a molecular weight in the range of 9,000 to 16,000, a softening point in the range of 80° to 95° C. and an amount of chlorine in the range of 18 to 22 percent, based on the weight of the polyolefin, 10 grams of Ethox SAM-2, 2 grams of glacial acetic acid, 124 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 2 weeks: No change
The results of freeze/thaw stability tests were a gel after 5 cycles. The results of paint adhesion tests were as follows:
Paint adhesion on polypropylene: 100% Adhesion
Paint adhesion on TPO: 100% Adhesion.

EXAMPLE 5

This example illustrates preparation of a composition of the invention using different amounts of the same components used in Example 3.

40 grams of CP 164-1, 15 grams of Ethox SAM-2, 2 grams of glacial acetic acid, 119 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 2 weeks: Slight settling
The results of freeze/thaw stability tests were a gel after 5 cycles. The results of paint adhesion tests were as follows:
Paint adhesion on polypropylene: 100% Adhesion.

Paint adhesion on TPO: 100% Adhesion.

EXAMPLE 6

This example illustrates preparation of a composition of the invention using different amounts of the same components used in Example 3.

40 grams of CP 164-1, 8 grams of Ethox SAM-2, 2 grams of glacial acetic acid, 126 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 2 weeks: Slight settling
The results of freeze/thaw stability tests were a slightly thickened composition after 5 cycles. The results of paint adhesion tests were as follows:
Paint adhesion on polypropylene: 100% Adhesion
Paint adhesion on TPO: 100% Adhesion.

EXAMPLE 7

This example illustrates preparation of a composition of the invention using the same amounts of components as used in Example 6 but a different chlorinated polyolefin.

40 grams of CP 343-1, 8 grams of Ethox SAM-2, 2 grams of glacial acetic acid, 126 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 2 weeks: Slight settling
The results of freeze/thaw stability tests were a slightly thickened composition after 5 cycles. The results of paint adhesion tests were as follows:
Paint adhesion on polypropylene: 100% Adhesion
Paint adhesion on TPO: 100% Adhesion.

EXAMPLE 8

This example illustrates preparation of a composition of the invention using different amounts of the same components as used in Example 7.

40 grams of CP 343-1, 10 grams of Ethox SAM-2, 3 grams of glacial acetic acid, 123 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability of 60° F. for 2 weeks: Slight settling
The results of freeze/thaw stability tests were a slightly settled composition after 5 cycles. The results of paint adhesion tests were as follows:
Paint adhesion on polypropylene: 80% Adhesion
Paint adhesion on TPO: 100% Adhesion.

EXAMPLE 9

This example illustrates preparation of a composition of the invention using different amounts of the same components as used in Example 8 and a different chlorinated polyolefin than used in Example 8.

40 grams of CP 164-1, 10 grams of Ethox SAM-2, 1 gram of glacial acetic acid, 124 grams of water and 0.4 grams sodium metabisulfite were charged to the vessel and the above described procedure undertaken. The resultant composition was diluted with sufficient additional water to result in a primer coating composition composed of 8 percent chlorinated polyolefin, based on the weight of total composition. This composition was applied to polypropylene and TPO. The results of storage stability tests were as follows:
Stability at 25° F. for 6 weeks: No change
Stability at 60° F. for 2 weeks: Slight settling
The results of freeze/thaw stability tests were a gelled composition after 5 cycles. The results of paint adhesion tests were as follows:
Paint adhesion on polypropylene: 80% Adhesion
Paint adhesion on TPO: 100% Adhesion.

We claim:
1. A composition comprising
   (A) a chlorinated polyolefin having a molecular weight in the range of 9,000 to 45,000, a softening point in the range of 75° to 105° C., and an amount of chlorine in the range of 15 to 35 weight percent, based on the weight of the polyolefin, and
   (B) 20 to 40 weight percent, based on the weight of the chlorinate polyolefin, of a cationic surfactant,
   (C) from 1.2 to 10 weight percent, based on the weight of the chlorinated polyolefin, of glacial acetic acid,
   (D) from 0.2 to 2 weight percent, based on the weight of the chlorinated polyolefin, of a salt of an oxyacid of sulfur, and
   (E) water.

2. The composition of claim 1 wherein the chlorinated polyolefin is a chlorinated, non imidized polyolefin having a molecular weight in the range of 9,000 to 16,000, a softening point in the range of 80° to 95° C. and an amount of chlorine in the range of 18 to 22 percent.

3. The composition of claim 1 wherein the chlorinated polyolefin is a chlorinated, imidized polyolefin having a molecular weight in the range of 9,000 to 16,000, a softening point in the range of 80° to 95° C. and an amount of chlorine in the range of 18 to 22 percent.

4. The composition of claim 1 wherein the cationic surfactant is a alkoxylated fatty amine.

5. The composition of claim 4 wherein the alkoxylated fatty amine is selected from the group consisting of a polyoxyethylene tallow amine or a polyoxyethylene stearyl amine.

6. The composition of claim 1 wherein the salt of the oxyacid of sulfur is sodium metabisulfite.

7. The composition of claim 1 wherein the amount of surfactant is in the range of 25 to 35 weight percent.

8. The composition of claim 1 wherein the amount of glacial acetic acid is in the range of 2 to 8 weight percent.

9. A composition comprising
   (A) a chlorinated, imidized polyolefin having a molecular weight in the range of 9,000 to 16,000, a softening point in the range of 80° to 95° C. and an amount of chlorine in the range of 18 to 22 percent, based on the weight of the polyolefin, (B) from 25 to 30 weight percent, based on the weight of the chlorinated polyolefin, of a polyoxyethylene tallow amine, (C) from 2.5 to 5 weight percent, based on the weight of the chlorinated polyolefin, of glacial acetic acid, (D) from 0.2 to 1.2 weight percent, based on the weight of the chlorinated polyolefin, of sodium metabisulfite, and (E) water.

* * * * *